Oct. 26, 1954

H. H. WEINSTOCK, JR., ET AL 2,692,875

METHACRYLONITRILE-ACRYLONITRILE COPOLYMERS AND FIBERS THEREOF

Filed June 17, 1949

INVENTORS.
HARRY H. WEINSTOCK, JR.
GLENN A. NESTY
BY

ATTORNEY.

Patented Oct. 26, 1954

2,692,875

UNITED STATES PATENT OFFICE 2,692,875

METHACRYLONITRILE-ACRYLONITRILE COPOLYMERS AND FIBERS THEREOF

Harry H. Weinstock, Jr., Madison, and Glenn A. Nesty, Morris Township, Morris County, N. J., assignors to Allied Chemical & Dye Corporation, New York, N. Y., a corporation of New York Application June 17, 1949, Serial No. 99,842

2 Claims. (Cl. 260—85.5)

This invention is directed to copolymers of acrylonitrile and methacrylonitrile and to fibers or filaments prepared from such copolymers.

Numerous synthetic polymers and copolymers have heretofore been described and proposed as materials from which molded articles, films, bristles, fibers or filaments, and the like may be prepared. Of the large number of such materials which have been described and suggested for such uses, a relatively few have found practical application because of the necessity that a commercially acceptable material combine suitable characteristics with respect to numerous properties. Certain characteristics are important for several or all of the various uses of these materials. For example, a polymeric material which is to be at all suitable for most purposes must have good resistance to attack by common solvents such as water and organic liquids used for cleaning purposes. For many purposes, e. g. for molding materials, films, fibers and coatings, the material must be resistant to weathering and have a suitably high softening temperature. Other properties are especially important in connection with particular uses. High tensile strength and flexibility are especially important in the case of materials to be made into fibers or filaments, films or coatings. The production of bristles requires a peculiar combination of flexibility, resilience and stiffness.

In addition to the properties the polymer itself has and imparts to the final product, there are factors important in connection with the making of those products. For example, when applied to surfaces as a coating material or in the production of fibers or films, a polymeric material with desirably high softening temperatures should have a suitable solubility in solvents so that solutions containing a relatively large amount of polymer may be prepared having proper viscosities for spinning, casting or use as coatings. The molecular weight of the polymer in solutions of proper viscosities must be such that the polymer deposited by evaporation of the solvent imparts the desirable combination of properties to the final product. It has, therefore, been recognized that while innumerable types of polymeric and copolymeric materials may be made up in the form of molded articles, films and fibers or filaments, or solutions thereof may be applied as coating materials, it is exceedingly difficult to find materials which exhibit the combination of desirable properties required to make them suitable for use in competition with other natural and artificial materials.

Polyacrylonitrile is a synthetic polymeric material which has long been known to the art. It has been described as suitable for use in the production of fibers or filaments, bristles, films, etc. In recent years fibers of polyacrylonitrile have been commercially produced and made available at least in limited quantities. It has also been proposed to copolymerize acrylonitrile with numerous other polymerizable materials such as esters of acrylic and methacrylic acids, dienes, vinyl esters, etc., to obtain copolymers with desirable properties different from polyacrylonitrile itself. A large variety of copolymers have been suggested but few of the many copolymers thus proposed have been of any practical significance; the only copolymers of acrylonitrile which appear to have been developed to any considerable extent being the copolymers with butadiene and with vinyl chloride.

Polymethacrylonitrile itself is a rubbery to stiffly plastic material with a relatively low softening temperature. It is soluble in common solvents such as cyclohexanone and acetone. Polyacrylonitrile itself is a hard, rigid material, with a relatively high softening temperature and subject to discoloration when heated. It is soluble only in a few solvents, none of which would ordinarily come into contact with materials made of the polymer. We have now discovered that certain copolymers of acrylonitrile and methacrylonitrile have properties different from those of the individual polymers of these materials which make the copolymers particularly suitable for numerous uses including preparation of molded articles, films, bristles and fibers or filaments. Those copolymers exhibit a particular combination of properties which make them especially suitable for the production of fibers or filaments.

We have discovered that by copolymerizing methacrylonitrile with acrylonitrile employing the monomers in the weight ratios of more than 15 parts methacrylonitrile to 85 parts acrylonitrile but not more than 30 parts methacrylonitrile to 70 parts acrylonitrile, copolymers are obtained which exhibit particular combinations of properties which make them peculiarly suitable for the production of molded articles, films, bristles, fibers or filaments and for numerous other purposes.

The ratio of the two monomers supplied to the reaction mixture in which they are polymerized primarily determines the composition of the copolymer. The copolymer will contain copolymerized methacrylonitrile and acrylonitrile in a ratio at least as great as that in which they are supplied to the reaction mixture. At high polymer yields (based on total monomers) the ratio of the two copolymerized nitriles is substantially that of the monomers employed. Even at relatively low polymer yields, e. g. 70% yield, the ratio of methacrylonitrile to acrylonitrile in the polymer does not greatly exceed that of the monomers supplied to the reaction mixture. Accordingly, the copolymers of our invention contain (by weight) more than 15 parts methacrylonitrile copolymerized with 85 parts acrylonitrile but not substantially more than 30 parts methacrylonitrile copolymerized with 70 parts acrylonitrile.

The peculiar advantages of those methacrylonitrile-acrylonitrile copolymers are found both in the character of the polymers themselves and, hence, of the products made therefrom, and also in the procedures which may be used for preparing the copolymers and converting them into fibers, films and the like. Unlike polymethacrylonitrile but like polyacrylonitrile, those copolymers are strong, firm solids with high softening temperatures and are substantially unattacked by all common solvents. Unlike polyacrylonitrile, our copolymers may be prepared by any one of several polymerization procedures to give polymeric material whose intrinsic viscosities (a measure of their average molecular weight) and solution viscosities in a solvent such as dimethyl formamide are such that the solutions may be spun into fibers or filaments of high ultimate tensile strengths (the stress required to break the fibers or filaments), good characteristics with respect to retention of original tensile strength when heated at elevated temperatures, high softening temperatures and high resistance to weathering. Further, depending upon whether certain treatments are given the fibers or filaments after spinning, they may have relatively high shrinkage in boiling water and low ultimate elongation (the increase in length of the fiber when stretched to the point at which it breaks) or be made to have little or no shrinkage in boiling water and a higher ultimate elongation; whichever may be desired for the particular uses to which the fibers or filaments are to be put.

The solubility and solution characteristics of our methacrylonitrile-acrylonitrile copolymers are important. They more readily dissolve in a given solvent than polyacrylonitrile. For example, in order to dissolve polyacrylonitrile in dimethyl formamide a mixture of solvent and solid polymer requires long agitation at elevated temperatures. Furthermore, in initially making the mixture, if the finely divided polymer is added to the solvent at room or higher temperatures, instead of dispersing throughout the solvent body, the particles of polymer wetted with the solvent tend to ball together into larger masses which are difficult to then get into solution. Special methods must be adopted to obviate this difficulty; such as prechilling the solvent to very low temperatures, adding the finely divided polymer and dispersing it in the prechilled solvent and then heating the mixture to elevated temperatures to dissolve the polymer. In the case of our copolymers, on the other hand, they may be added to and dispersed in the dimethyl formamide at room temperatures and on continued mixing of the mass the polymer goes into solution at those temperatures.

The following more specifically illustrates this difference in solution characteristics of our copolymers as compared with polyacrylonitrile:

About 70 parts by weight dimethyl formamide were placed in a container provided with a stirrer and 10 parts polyacrylonitrile were added followed by the addition of 20 more parts of the dimethyl formamide. The stirrer was started; after sitrring for one hour and 50 minutes, the mixture was still cloudy containing many fine particles and was unsuitable for spinning. The solution was then heated to 60° C. and stirred for 5 minutes to complete solution of the polyacrylonitrile. Three additional parts of polymer were added and after 50 minutes stirring solution of this additional polymer was still incomplete. Employing the same apparatus and procedure, 10 parts of a copolymer prepared from 20 parts methacrylonitrile to 80 parts acrylonitrile were mixed with dimethyl formamide at room temperature and stirred 15 minutes. Practically all of the copolymer had gone into solution. Three additional parts of the copolymer were then added and the stirring continued for an additional 10 minutes. At the end of this time all of the polymer had dissolved in the solvent to give a solution free of undissolved polymer.

As in the case of polyacrylonitrile, our copolymers may be dissolved in the solvent by first dispersing the solid into prechilled solvent at, for example, −15° C. The dispersion of solid in solvent may then be warmed to room temperature and stirred to dissolve the copolymer without the necessity of heating the mixture to elevated temperatures. Where copolymers of different intrinsic viscosities or compositions are being prepared and dissolved in a solvent to form solutions of relatively high or variable concentrations for testing, the latter method of making up the solutions may be employed to ensure ready and complete solution of the material under different conditions. However, in large scale operations where the production of the polymer and the conditions for dissolving it have been standardized, the former method of mixing and dissolving the material in the solvent at room temperature is preferred as being more economical.

The relationship between intrinsic viscosity (a measure of the molecular weight of a polymer), concentration of polymer in solution and viscosity of the solution is important with respect to the spinning characteristics of a polymer solution and the character of fibers spun therefrom. For example, for the production of fibers or filaments of polyacrylonitrile or our methacrylonitrile-acrylonitrile copolymers, it is particularly desirable to spin the fibers or filaments from polymers with intrinsic viscosities of 2.5 to 6.5 dissolved in dimethyl formamide in concentrations such that the solution has a viscosity of 600–800 poises at the spinning temperature. Furthermore, it is desirable the solutions of the polymers of these intrinsic viscosities and solution viscosities should contain a high concentration of polymer.

Solutions in dimethyl formamide (14% polymer concentration) of two polyacrylonitriles, one having an intrinsic viscosity of 3.4 and the other of 3.15, had viscosities of 1320 and 2000 poises, respectively, at room temperature. While both solutions could be spun to form fibers, their high viscosities presented difficulties in their spinning. Our 20/80 methacrylonitrile/acrylonitrile copolymers, on the other hand, with intrinsic viscosities of 3.0 and 3.25 gave solutions in dimethyl formamide (containing 16% and 15% polymer), respectively, having viscosities of 720 poises at room temperature; in the optimum range for spinning. A 20/80 copolymer of our invention having an intrinsic viscosity of 6.34, dissolved in dimethyl formamide gave a 9% solution with a viscosity of 790 poises at room temperature. A polyacrylonitrile having the same intrinsic viscosity (6.35) dissolved in dimethyl formamide gave a 9% solution having a viscosity of 1120 poises at the same temperature. Thus, our copolymers may be prepared having a high intrinsic viscosity, and resulting increased strength retention when heated to elevated temperatures, without increasing the viscosities of their solutions of a given concentration or decreasing the concentration of polymer in solution of a given viscosity to the extent these changes in solution characteristics occur in the case of polyacrylonitrile. This is important in spinning filaments or fibers of the polymers where the solution viscosities are important, and are desirably in the range about 500 to about 1000 poises at the spinning temperature and should not exceed 1500 poises.

When the aforedescribed copolymers of methacrylonitrile and acrylonitrile prepared from the monomers in ratios greater than 15/85 and not greater than 30/70 are dissolved in suitable solvents and spun into fibers or filamenst, the fibers or filaments may be stretched 400% to 1000% or more while heated at suitable stretching temperatures to give molecularly oriented products of high tensile strength. The fibers or filaments thus prepared are characterized by greater resistance to heat, greater wet and dry strengths, lower water absorption, greater resistance to sunlight and weathering and to common organic solvents than most of the synthetic and natural fibers now in commercial use. In these and other respects our copolymers, when spun into fibers or filaments, exhibit a unique combination of properties not possessed by the synthetic fibers heretofore produced.

The copolymerization with acrylonitrile of a material, such as methacrylonitrile, which when polymerized alone gives polymers of low softening points, would be expected to give a copolymer which would lose its tensile strength at elevated temperatures more than the polymer of acrylonitrile itself. We have surprisingly found, however, that our methacrylonitrile-acrylonitrile copolymers retain their tensile strength at elevated temperatures as well as, and in some cases even better than, polyacrylonitrile.

It would also be expected that the copolymerization of acrylonitrile with a material which gives plastic polymers of lower softening temperature than polyacrylonitrile itself, would lead to the formation of copolymers which more readily deteriorate on exposure to the weather. Surprisingly enough the methacrylonitrile-acrylonitrile copolymers of our invention have been found to be as resistant or even more resistant towards weathering than polyacrylonitrile.

The products made from our copolymers may contain materials other than the copolymers. Inert materials which do not affect the properties of the copolymer itself, may be mixed therewith. For some purposes it may be desirable to incorporate with the copolymer a plasticizing agent. Also, in preparing our copolymers, small amounts of other polymerizable materials may be mixed with or polymerized with the methacrylonitrile and acrylonitrile.

The copolymers of our invention are prepared by polymerizing a mixture of the monomers in a ratio in the range specified above by any of the several procedures suitable for polymerizing these monomers individually or the esters of acrylic acid or esters of methacrylic acid. Such procedures generally are of three types: (1) emulsion polymerization, (2) suspensian polymerization, and (3) solution polymerization.

Suitable emulsion polymerization procedures are described, for example, in U. S. P. 2,140,048, issued December 13, 1938 to Fikentscher and Heuck, and in U. S. P. 2,086,093, issued July 26, 1937 to Plauson. An emulsion of the monomers in water containing a dispersing or emulsifying agent is prepared and a suitable polymerization catalyst is added. Commonly employed catalysts are hydrogen peroxide, an organic peroxide or other oxygen-yielding compound such as a per salt (e. g. an ammonium or alkali metal persulfate), and redox catalysts, which are an oxygen-yielding compound together with an oxidizable material, e. g. a persulfate and a bisulfite. The monomer emulsion containing the polymerization catalyst is held at temperatures at which polymerization proceeds to form the copolymer which is insoluble in the aqueous medium in which the polymerization takes place. The solid polymer, coagulated if necessary, is filtered from the aqueous reaction medium and purified by washing with water, methanol or other solvents for the impurities present in the polymer.

The suspension procedures differ from the emulsion procedures in that no extraneous dispersion or emulsifying agent is present. The monomers in the form of small particles dispersed by agitation throughout an aqueous solution of the catalyst are polymerized at suitable temperatures. Such suspension polymerization processes are described in U. S. P. 2,296,403, issued September 22, 1942. The solution procedures differ from the suspension procedures in that in the former only sufficient monomers are added to the aqueous reaction medium containing the catalyst for all of the monmeric material to be dissolved.

The principal disadvantage of the solution procedures over either the emulsion or suspension procedures for copolymerizing methacrylonitrile and acrylonitrile arises from the very low solubility of these monomers in water. For example, at 40° C. methacrylonitrile is soluble only to the extent of 2½% in water and acrylonitrile to the extent of 8.0%. Mixtures of the two monomers have solubilities in water intermediate between the 2.5% and 8.0% solubilities of the individual monomers. Accordingly, the solution polymerization procedure has the disadvantage that relatively small amounts of monomers may be polymerized in large volumes of the aqueous reaction medium. The reaction medium may be modified by adding a supplementary solvent in addition to water to give a mixed solvent in which the monomers are more soluble than in water (described in U. S. P. 2,072,904, which issued March 9, 1937 to Ries, and in U. S. P. 2,121,839, which issued June 28, 1938 to Strain).

The addition of such supplementary solvent complicates the process and increases its cost and may lead to undesirable modifications in the character of the polymer. Accordingly, we consider this a less desirable procedure for preparing our copolymers than one in which water containing the catalyst, and the dispersing or emulsifying agent when this is used, is the reaction medium in which the polymerization of the monomers is carried out. The emulsion procedure has the disadvantage of requiring the use of a dispersing or emulsifying agent.

The choice of polymerization procedure used for its production affects the character of polyacrylonitrile more than it affects the character of our copolymers. Accordingly, good fibers may be prepared from our copolymers produced by any one of the three procedures described above. When suitably prepared by any one of the three types of polymerization procedures, even with polymer yields of 70% or more, they may be spun into fibers and the fibers stretched 400% or more without appreciable discoloration to give products which have high tenacities, are not brittle but have a soft, pliable feel, and have a desirable moderate degree of elongation under stress before breaking. On the other hand, the most advantageous procedure, considering both the preparation of the copolymers and their conversion into fibers, is to employ the suspension method. This procedure does not require the presence of an added dispersion or emulsifying agent or supplementary solvent which must be washed out of the polymer, nor does it require handling the large volumes of aqueous reaction mixture of the solution procedure using water as the solvent.

Our copolymers of methacrylonitrile and acrylonitrile may be converted into films, fibers or filaments by dissolving the polymeric material in dimethyl formamide, butyrolactone or other solvent for the polymer to form a solution of suitable viscosity for casting as a film or extruding or spinning into filaments or fibers by the procedures commonly employed for forming these products from solutions of resins in solvents. Two types of methods for thus treating soutions of resins are well known and either may be employed with the solutions of our copolymers; (1) the dry-casting or dry-spinning procedures and (2) the wet-casting or wet-spinning processes. The processes for dry-casting films are characterized by the polymer solution being cast or distributed on a supporting surface. By evaporation of solvent a film of the polymer is deposited of sufficient strength to be lifted from the supporting surface and further treated to remove solvent and leave the desired film structure of the resin. The dry-spinning process is similarly characterized by evaporation of solvent into a drying atmosphere, the solution being spun through spinnerets to form filaments or fibers from which the solvent is evaporated. The second type of process generally finds its application in the wet-spinning of filaments or fibers. It is characterized by filaments of the resin solution spun from a spinneret being passed through a liquid in which the solvent is soluble but the resin itself is insoluble. The liquid bath acts to extract solvent from the spun filaments or fibers to coagulate the resin sufficiently for the fibers or filaments to be further treated as desired, e. g. to evaporate solvent remaining in the fibers, stretch them to increase their tenacity, etc. The wet or dry casting and spinning procedures are suitable for converting the copolymers of our invention into films, fibers, bristles or the like.

As is well known, the characteristics of filaments or fibers or of films spun or cast from certain synthetic polymers may be substantially altered by treatments given during or subsequent to their spinning or casting. Drawing or stretching the fibers or films at temperatures at which they are plastic is known to molecularly orient the structure of certain polymers and to improve the tenacity, strength and other properties of fibers or filaments or films made of those polymers. The same drawing or stretching of our methacrylonitrile-acrylonitrile copolymers orients the polymer structure, increases the tenacity or strength and improves in other respects fibers and films of the copolymers. Fibers or films made of some resins after stretching in the manner described may be heat-treated while under insufficient tension to prevent them from shrinking while heated. This "relaxation" of certain fibers or films improves their ultimate elongation (the amount which the fibers or films may be stretched before breaking) and reduces their shrinkage when later subjected to elevated temperatures. Fibers or filaments and films made of our copolymers, when subjected to these treatments, show improved characteristics in the respects mentioned.

The production of fibers or filaments is particularly exacting with respect to the nature and properties of the material from which the fibers are to be produced. Accordingly, our invention specifically includes, and will be primarily described in connection with, the production of fibers or filaments, although it is to be understood that many of the factors making the polymers of our invention particularly suitable therefor are equally important in other connections such as for films, coatings, bristles, etc.

Because of the influence on the character of products produced from synthetic polymers by the procedure used for their production, our invention comprises the following preferred process for the production of a copolymer by polymerizing a mixture of about 20 parts methacrylonitrile to 80 parts acrylonitrile and for converting the resulting copolymer into fibers.

I. *Production of the copolymers*

A mixture of about 20 parts by weight methacrylonitrile and 80 parts by weight acrylonitrile in water is vigorously stirred to disperse the methacrylonitrile and acrylonitrile in the form of fine particles or droplets throughout a continuous aqueous phase and is heated to a temperature in the range of 30° C. to 70° C. To this aqueous dispersion of the monomers there is added as catalyst for their polymerization an ammonium or alkali metal persulfate, with or without an ammonium or alkali metal bisulfite also being added. The amount of persulfate is suitably within the range 0.1 to 3.0 parts by weight (calculated as $S_2O_8$) for every 100 parts of the total monomers present and when bisulfite is also added it is suitably in the range 0.2 to 4 parts by weight (calculated as $HSO_3$) for every 1 part by weight of persulfate.

After addition of the catalyst vigorous stirring of the aqueous reaction mixture is continued and its temperature is maintained within the range 30° C. to 70° C. until at least 70%, and preferably more than 80%, of the monomers present have polymerized. Under these conditions a filterable slurry of polymer is obtained. During preparation of the monomer dispersion and polymerization an atmosphere of nitrogen gas is maintained over the reaction mixture.

It is generally desirable as the polymerization reaction proceeds to add water to the reaction mixture in amount sufficient to compensate for contraction of volume which occurs as a result of the polymerization and to maintain the same volume of reaction mixture. This addition of water prevents the polymer suspension which is formed from becoming so stiff as to interfere with the agitation of the mixture. The water addition facilitates maintaining uniform reaction conditions with respect to dispersion of the monomers, temperature and the like, throughout the progress of the polymerization.

When polymerization has proceeded to the desired degree, the solid polymer is filtered from the aqueous phase and is washed with water and then with methyl alcohol to remove water-soluble materials and unconverted monomers from the polymer.

II.—Preparation of and spinning the polymer solution

The methacrylonitrile-acrylonitrile copolymer produced by any of the methods hereindescribed, or specifically one produced by the preferred methods of I above, is dissolved in a solvent for the copolymer to form a solution having a suitable viscosity for spinning. The solvent is best one having a boiling point below 175° C., such as dimethyl formamide, to facilitate its evaporation from the fibers or films spun or cast from the solution.

In dissolving the polymer the finely divided solid is dispersed uniformly in a body of solvent and the mixture is stirred until the polymer is all or substantially all in solution. If it should be desired to increase the rate at which the copolymer dissolves, the mixture may be warmed above room temperature. The solution of copolymer is filtered or centrifuged in those cases where this is desirable to remove any residual undissolved particles or air bubbles.

A wet-spinning process for converting our copolymers into fibers and yarns is diagrammatically illustrated in the accompanying drawing.

Figure 1:
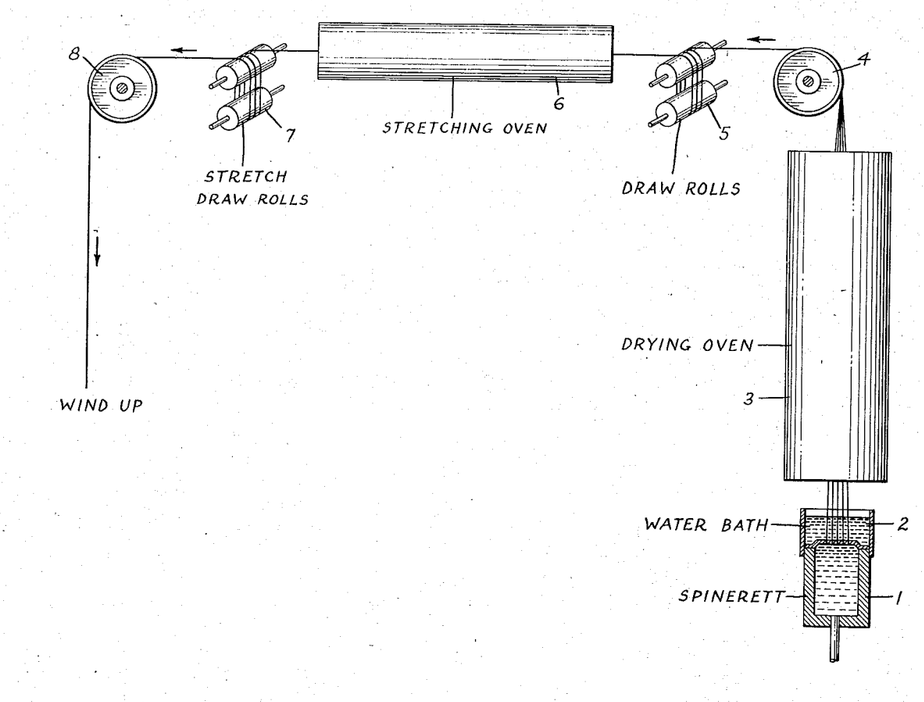

A solution is prepared of the methacrylonitrile-acrylonitrile copolymer in dimethyl formamide, having a viscosity at the temperature at which it is to be spun (preferably room temperature of about 20–25° C.), not less than 200 and no greater than 1500 poises, preferably about 500 to about 1000 poises. This solution is spun by means of a spinneret 1 directly into a water bath 2 through which the filaments from the spinneret are drawn for a short distance to permit the water to extract from the filaments a portion of the solvent. Sufficient solvent is removed by the water bath to leave the filaments non-tacky and pliable but strong enough to be drawn from the water bath through the subsequent solvent evaporation step. The amount of solvent removed from the filaments depends upon the filament size, temperature of the water bath, time of passage of the filaments therethrough and concentration of solvent in the water bath. Specific conditions suitable for spinning will be illustrated by examples hereinafter described in detail. In general, however, for filaments spun at room temperature from solutions having viscosities of 500 to 1000 poises through about 5 mil diameter openings and passed through a water bath containing no more than 20% dimethyl formamide solvent, a period of 0.5 to 2.5 seconds travel through the water bath will result in removal of a desired amount of the solvent from the filaments. When the diameter of the spinneret holes is increased above or descreased below 5 mils, the time of travel of the filaments through the water bath should be increased or descreased, respectively. A bundle of filaments spun through a water bath tends to carry with it out of the bath a column of water between the filaments which may interfere with the subsequent drying step. This may be prevented by maintaining a thin layer of a hydrocarbon oil on the water bath surface from which the filaments are withdrawn.

The filaments drawn from the water bath are first passed through a drying chamber 3 where they are heated in air to remove solvent left in the filaments by the water bath. The filaments are collected into a bundle or yarn of filaments or fibers on pulley 4 and then passed around positively driven Godet wheels or draw rolls 5 which serve to draw the filaments from the face of the spinneret through the drying oven.

Complete or practically complete solvent removal from the fibers in the drying step is neither necessary nor, in general, desirable. The short time of passage of the fibers through the drying oven at desirably high spinning rates generally would require heating the fibers to deleteriously high temperatures to remove all the solvent. Drying the fibers to 10% to about 20% solvent content represents satisfactory conditions in this step of the process.

For producing highest strength filaments it is preferred to dry the fibers to a solvent content of about 6% to 10%. This can be done by the procedure illustrated in the drawing. A preferred alternative, however, is to dry the filaments to a solvent content of about 15% to about 20% during passage through drying oven 3. The filaments are taken off from draw rolls 5 to a reel not shown in the drawing. The reeled filaments are placed in an oven or heating chamber in which they are dried until their solvent content is reduced to 6% to 10%. The thus dried filaments are then stretched in the manner described below, being drawn from the reel by Godet wheels, not shown in the drawing, functioning in the same way as draw rolls 5 in the process illustrated in the drawing to direct the filaments through the stretching oven and as a snubber.

From Godet wheels 5 the yarn is drawn through a stretching oven 6 by positively driven Godet wheels or stretch draw rolls 7. In oven 6 the yarn is heated to suitable drawing or stretching temperature and is stretched a desirable degree by driving stretch rolls 7 at a peripheral speed greater than draw rolls 5. Preferably, the yarn is stretched at least 400% at temperatures of about 140° to about 170° C. For the production of yarn or filaments of greatest tensile strength the yarn is stretched to a point just short of break. In other words, the yarn or filaments are stretched as much as possible without interfering with the smooth operation of the spinning process by breakage in the stretching step. From rolls 7 the yarn passes over a pulley 8 and thence to a bobbin or other wind-up device.

In heating the yarn to stretch it, only a minor amount of the solvent present in the yarn entering the stretching oven is vaporized. For example, yarns entering the stretching oven with 6% and 20% solvent content leave the stretching step containing about 5% and about 15% solvent, respectively. Thus, in the preferred processes described above, the yarns are stretched while containing 5% to 20% solvent (dimethyl formamide) and the stretched yarns contain 5% to 15% residual unevaporated solvent. Stretched yarns, particularly those with solvent contents in the upper portion of this range, may be treated to reduce their solvent content, e. g. by heating to moderate temperatures in air or soaking in water or other liquid which does not harm the yarn but in which the solvent is soluble.

The preferred procedure described above results in the production of fibers, yarns or filaments of high tensile strength suitable for many purposes. It is frequently desirable, however, to modify the character of these products. For example, yarns or threads to be knitted or woven into fabrics desirably have a certain degree of stretch, measurable in terms of ultimate elongation. (Ultimate elongation is the percent increase in the yarn or filament length under that stress at which breakage of the yarn or filament occurs.) It is also desirable for many uses that the yarns or filaments do not shrink to a substantial degree when boiled in water or subjected to even higher temperatures required for ironing fabrics.

The ultimate elongation of yarn or filaments produced by the procedure described above is generally substantially below the optimum desired for knitting or for weaving the yarn or filaments into fabric. Also, when boiled in water or heated to temperatures of the order of 150° C., the yarns or filaments obtained by the described procedure will generally show a substantial shrinkage. When desired, however, the ultimate elongation may be increased and the shrinkage of the products when boiled in water may be practically eliminated and their shrinkage when heated even to higher ironing temperatures of the order of 150° C. may be reduced to a point at which it is negligible, by a supplemental "relaxing" treatment of the yarns or filaments following the stretching step.

In this relaxing treatment the stretched yarns or filaments are heated at a temperature in the range 150° C. to 200° C. while being held in a relaxed state or under a tension low enough for them to be free to shrink a desired amount at these elevated temperatures. The yarns or filaments may be relaxed by heating in air or in a hot bath of any liquid which does not deleteriously affect the polymer, such as hydrocarbon oil. The yarn is permitted to shrink at the elevated temperature until its ultimate elongation is increased and its residual shrinkage upon boiling in water or reheating to temperatures no higher than the temperature to which it is heated in the relaxing step is decreased to within desirable ranges for each of these two characteristics of the yarns or filaments. We have discovered that the polymerization of the mixtures of methacrylonitrile and acrylonitrile in the desired ratios of 15/85 to 30/70 to produce the copolymers to which our invention is directed, produces materials which, after being stretched to orient them and increase their ultimate tensile strength, may be relaxed by heating to greatly increase their ultimate elongation and give products with little residual shrinkage upon being boiled in water or heated to temperatures no higher than that at which they were relaxed, without at the same time losing most of the increase in tensile strength imparted by the stretching.

Additional treatments of the yarns or filaments produced by the process described above may be employed to further modify their characteristics. For example, for certain purposes it may be desirable to include an annealing step for the yarns or filaments, in which they are heated for a short period of time at elevated temperatures while held under sufficient tension to prevent any shrinkage of the yarns or filaments. This annealing may be carried out after the stretching but before the relaxing treatment, or it may be carried out after the relaxing step. The annealing temperatures may be the same as those employed in the relaxing step or where a relatively high relaxing temperature is employed, e. g. 175°–200° C., the annealing may be carried out at a lower temperature, e. g. at about 150° C. The heating may be in air or in a heated bath of any liquid which does not deleteriously affect the fibers.

While preferred procedures for preparing the methacrylonitrile-acrylonitrile copolymers and spinning them into fibers have been described and the following examples further illustrate the preferred procedures, it is to be understood that our invention is not limited to these particular preferred operations.

Unless otherwise indicated, in these examples and throughout this specification the amounts of materials are given in parts by weight. Yields are based on percent by weight of total monomers recovered as polymer. Amount of stretch is expressed as percent increase over initial length, e. g. a yarn stretched 400% has been stretched to five times its initial length. The following abbreviations are used in their usual significance:

U. T. S.=ultimate tensile strength
U. E.=ultimate elongation

Distilled or de-ionized water is used in making up the polymerization reaction mixtures. Acrylonitrile and methacrylonitrile obtainable on the market are purified before use by distillation or by washing with an aqueous solution of an acid (e. g. hydrochloric or sulfuric acid) in the case of the acrylonitrile and by washing with an aqueous solution of an alkali (e. g. sodium hydroxide) in the case of the methacrylonitrile.

*Example 1.*—To a vigorously stirred mixture of 704 parts methacrylonitrile, 2816 parts acrylonitrile and 15,840 parts water at 35° C. under an atmosphere of nitrogen gas, 12.32 parts potassium persulfate and 19.00 parts sodium metabisulfite (corresponding to 0.248 part $S_2O_8$ per 100 parts total monomers and 1.85 parts $HSO_3$ for every 1 part $S_2O_8$) were added. The mixture was held at temperatures in the range 34°–37° C. for 3¼ hours following addition of the persulfate and bisulfite with continuous vigorous stirring of the mixture during this period. Twenty minutes after the polymerization of the monomers started, water was progressively added to the reaction mixture at the rate of 8 parts per minute. A filterable slurry of copolymer of methacrylonitrile and acrylonitrile was formed. The solid copolymer was filtered from the aqueous liquid, washed first with water and then with methanol and dried. Dried polymer amounting to 3080 parts was thus obtained, corresponding to 87.8% yield. The copolymer had an intrinsic viscosity of 3.92.

(The intrinsic viscosities given in this application are those determined for a solution of 0.125 gram of the polymer per 100 cc. of solution of the polymer in dimethyl formamide, employing Ostwald-Fenski tubes. The numerical values for the intrinsic viscosities are calculated using the equation:

Intrinsic viscosity =

$$\left( \frac{\text{Time of efflux of solution} - \text{Time of efflux of solvent}}{0.125 \times \text{Time of efflux of solvent}} \right)$$

The polymer thus obtained was dissolved in dimethyl formamide in amount sufficient to give a 13% solution of polymer in the solvent. It had a Brookfield viscosity of 920 poises at 23° C.

This solution was spun at room temperature of 74° F. (23° C.) into fibers employing the process described above and illustrated in the accompanying drawing. The solution was forced through a spinneret having 48 holes, each 5 mils in diameter. Under a pressure of 10 p. s. i. the solution was forced through the spinneret orifices at the rate of 0.495 gram per minute. The spinneret face was submerged ¾" below the surface of a water bath covered with a layer of oil (toluene) ⅛" thick. The filaments were drawn from the spinneret up through the water bath and thence vertically through a drying oven by means of the spinning draw rolls at the rate of 2.62 feet per minute peripheral speed of the draw rolls. The temperature in the drying oven was 80° C. in the part through which the filaments first passed and 135° C. in the upper portion of the drying oven. From the spinning draw rolls the filaments, which had been gathered together as a yarn-like tow, were drawn through the stretching oven by means of the stretching draw rolls. The temperature in the stretching oven was 155° C. and the peripheral speed of the stretching draw rolls was 32.6 feet per minute, 12.4 times that of the spinning draw rolls so that the yarn heated in the stretching oven was stretched 1140%. The yarn was taken up from the stretching step on a wind-up spool or bobbin at the rate of 31 feet per minute.

The yarn spun in the described manner from the 20-80 methacrylonitrile-acrylonitrile copolymer was clear and colorless. It had an U. T. S. of 6.0 g./d. and U. E. of 7%. Its denier was 61.

Yarn similarly spun from this copolymer, except that it was stretched 920% heated at 160° C., had an U. T. S. of 5.4 g./d. and an U. E. of 8%. Its denier was 73. This yarn was relaxed 30% by heating 5 seconds in air at 192° C. to give a yarn with an U. T. S. of 4.4 g./d., an U. E. of 13.5% and a denier of 87. This yarn was tested for strength retention when heated to elevated temperatures both before and after the relaxation treatment. Before relaxation, when heated to 100° C. the yarn had an U. E. of 11.5% and an U. T. S. of 3.6 g./d., retaining 67% of its original strength. Heated at 140° C., the yarn had an U. E. of 19% and an U. T. S. of 2.0 g./d., retaining 36% of its original strength. After relaxation, the yarn heated to 100° C. had an U. E. of 14% and an U. T. S. of 3.3 g./d., retaining 74% of its original strength. Heated at 140° C. it had an U. E. of 18% and an U. T. S. of 2.1 g./d., retaining 47% of its original strength. Before relaxation, the yarn shrank 8.9–9.4% when placed in water which was then heated to 100° C. and maintained at that temperature for 15 minutes. After relaxation the yarn shrank 2.3–3.4% when thus heated in water.

*Example 2.*—To a vigorously stirred mixture of 40 parts methacrylonitrile, 160 parts acrylonitrile and 900 parts water at 35° C. under an atmosphere of nitrogen gas, 3.24 parts potassium persulfate and 0.576 part sodium metabisulfite (corresponding to 1.16 parts $S_2O_8$ per 100 parts total monomers and 0.212 part $HSO_3$ for every 1 part $S_2O_8$) were added. The mixture was held at 35° C. for 2¾ hours following addition of the persulfate and bisulfite with continuous vigorous stirring of the mixture during this period. At the end of this time a filterable slurry of copolymer of methacrylonitrile and acrylonitrile was formed. The solid copolymer was filtered from the aqueous liquid, washed three times, first with water and one with methanol and dried. Dried polymer amounting to 149 parts were thus obtained, corresponding to 74.5% yield by weight of the total monomers employed. The copolymer had an intrinsic viscosity of 3.66.

The polymer thus obtained was dissolved in dimethyl formamide to give a 13% solution of polymer in the solvent. The resulting solution had a Brookfield viscosity of 660 poises at 24° C.

This solution was spun at room temperature of 74° F. (23° C.) into fibers employing the wet spinning process of Example 1. Under a pressure of 8 p. s. i. the solution was forced through the spinneret orifices at the rate of 0.80 gram per minute. The spinneret face was submerged ⅞" below the surface of a water bath which was covered with a layer of oil ⅛" thick. The filaments were drawn from the spinneret through the water bath and a drying oven by means of the draw rolls at the rate of 3.42 feet per minute peripheral speed of the draw rolls. The temperature in the drying oven was 80° C. in the part through which the filaments first passed and 135° C. in the upper portion of the drying oven. The dried yarn stretched 900% heated at 151° C. in the stretching oven, had an U. T. S. of 4.0 g./d. and U. E. of 7%. Its denier was 94. When stretched 960% at 160° C., the yarn had an U. T. S. of 4.1 g./d., the same U. E. of 7%, and a denier of 85.

For comparison with the production and spinning of the methacrylonitrile-acrylonitrile copolymer of this example, 200 parts acrylonitrile instead of the 200 parts total acrylonitrile plus methacrylonitrile were polymerized by the same procedure described above, except that a reaction time of 1 hour and 20 minutes was required to obtain a 74% yield of polyacrylonitrile (148 parts polymer). At the end of this reaction period a part of the polyacrylonitrile was present in suspension as a filterable slurry but considerable polymer was coagulated as a shell on the inside surface of the reaction vessel. The washed and dried polymer had an instrinsic viscosity of 6.35.

Finely divided acrylonitrile polymer thus prepared was mixed with dimethyl formamide which had been cooled to −15° C. in amount sufficient to make a 10% solution of the polymer in the solvent. After thorough dispersing the solid polymer in the cold solvent the mixture was stirred for a period at room temperature and then at 50° C. for 3 hours. The resulting solution was centrifuged to remove most of the undissolved material and obtain a hazy "solution" with some undissolved polymer still remaining suspended in the solution. The solution had a viscosity of 1380 poises at 24° C.

The polymer solution thus prepared was spun at a room temperature of 76° F. (24° C.) by the procedure of this Example 2 as described above, with the following exceptions: 30 p. s. i. pressure was required to spin the polymer solution at a rate of 0.800 gram per minute through a spinneret with 48 holes, each 7 mils in diameter. A water bath 2¼" deep over the face of the spinneret, covered with ⅛" of oil was used. The yarn dried at 83° C. and then at 115° C. was stretched short of break 470% at 184° C. stretching oven temperature. The resulting yarn had a pronounced yellowish color, an U. T. S. of 2.9–3.1 g./d. and an U. E. of 6%. Its denier was 240–250.

To illustrate the effects of treating the spun fibers to relax them after stretching, methacrylonitrile and acrylonitrile were copolymerized at 35° C. by a procedure identical with that described in Example 2, except that the reaction period was 4 hours. There was obtained 173 parts of polymer (an 86.5% yield) having an intrinsic viscosity of 4.17. A 13% solution of this polymer in dimethyl formamide had a viscosity of 1040 poises at 25° C.

The solution was wet spun at 74° F. (23° C.) and the yarn stretched by the process described above for Example 2, with the following modifications: A spinneret with 42 holes, each 8 mils in diameter, was employed for spinning into a water bath 6" deep over the face of the spinneret covered with a ¼" layer of toluene. Under a pressure of 13 pounds p. s. i. the solution was extruded at the rate of 1.12 grams per minute. The filaments were dried first at 90° C. and then at 138° C. and stretched 765% to 828% at 168–170° C. in the stretch oven. As spun and stretched yarns with U. T. S. in the range 3.6 to 4.1 g./d. were obtained and having U. E. in the range 6% to 7%. The yarn deniers were 78–96.

A portion of the yarn thus produced was heated in a relaxed condition at 180° C. for 4 minutes. The yarn shrunk about 30%. The U. T. S. of the shrunk yarn was 3.4 g./d., its U. E. 18.5%. The shrunk yarn heated to 100° C. retained 61% of the strength it had at room temperature (24° C.) and on heating to 140° C. retained 42% of its strength at room temperature.

*Example 3.* — Methacrylonitrile-acrylonitrile were copolymerized employing a 20/80 ratio of the monomers and the same procedure as in Example 2 above, except that 1.08 parts of potassium persulfate and 0.192 sodium metabisulfite were added for every 200 parts total monomers (0.384 part $S_2O_8$ per 100 parts monomers and 0.214 part $HSO_3$ for every 1 part $S_2O_8$) and the polymerization temperature was 50° C. at the start and rose in the range 50° C. to 68° C. during the polymerization period. After an 80 minute reaction period, which was preceded by a 3 minute induction period, the slurry of copolymer was filtered, and the product washed and dried.

A 10% solution of this copolymer in dimethyl formamide having a Brookfield viscosity of 800 poises at 26° C. as initially prepared, was allowed to stand for one week under an atmosphere of nitrogen. It was then stirred and centrifuged. The aged solution had a Brookfield viscosity of 840 poises at 240° C. It was spun at a room temperature of 74° F. (23° C.) through a spinneret having 48 holes each 5 mils in diameter, through a water bath 1 inch deep over the face of the spinneret covered with a ⅛ inch layer of toluene. The yarn formed by gathering the filaments was dried first at 80° C. and then at 135° C. and stretched 680% at 160° C. The resulting yarn had an U. T. S. of 4.4 g./d., U. E. of 7% and denier of 105. Heated at 100° C. the yarn retained 58% of its strength at room temperature and at 140° C. retained 40% of its strength at room temperature.

Yarn similarly spun from the 10% solution of this copolymer in dimethyl formamide as freshly prepared, without aging as in the foregoing example, had an U. T. S. of 4.4 g./d., U. E. of 6.5% and a denier of 77 when stretched 804% at 154° C.

Yarn was made from methacrylonitrile-acrylonitrile copolymer prepared by a process similar to that described above for Example 3, except that the amounts of potassium persulfate and of sodium metabisulfite were doubled; i. e., 2.16 parts of potassium persulfate and 0.384 part of sodium metabisulfite were employed in the reaction mixture made up with 40 parts methacrylonitrile, 160 parts acrylonitrile and 900 parts water and the temperatures were maintained in the range 35°–40° C. during the polymerization. At the end of 5 hours reaction time a 92% yield of polymer with intrinsic viscosity of 3.80 was recovered.

A 13% solution of this polymer in dimethyl formamide having a Brookfield viscosity of 780 poises at 24° C. was spun through a 1⅜ inch deep water bath at a room temperature of 74° F. (23° C.), the yarn dried under the conditions described above was stretched 950% heated at 155° C. Two yarns thus prepared were twisted together to give a heavier yarn (152 denier) suitable for testing in a weatherometer. The two-ply yarn had an U. T. S. of 4.2 g./d. and an U. E. of 6%. It was exposed to an accelerated weathering test in a weatherometer. After 1460 hours in the weatherometer the yarn had an U. T. S. of 4.1 g./d. and an U. E. of 6.5%, showing no significant change in strength or elongation before break as compared with the yarn before weathering. A polyacrylonitrile yarn having an U. T. S. of 3.2 g./d., an U. E. of 14% and a denier of 202, exposed simultaneously and for the same length of time in the weatherometer as the copolymer yarn at the end of this test had an U. T. S. of 2.4 g./d. and an U. E. of 9%, indicating a loss of 25% of its initial ultimate tensile strength after exposure in the weatherometer for 1460 hours. Its U. E. after exposure was 9% as compared with 14% before exposure.

*Example 4.*—This example illustrates the results obtained in preparing our copolymers employing a persulfate alone as catalyst rather than the redox catalysts employed in the foregoing examples.

A mixture of 160 parts methacrylonitrile, 640 parts acrylonitrile suspended by agitation in 3580 parts water under an atmosphere of nitrogen gas was heated to 62° C. and 3.2 parts of ammonium persulfate added corresponding to 0.337 part $S_2O_8$ for every 100 parts total monomers. The temperature was maintained in the range 62° to 66° C. for 3 hours. The resulting copolymer was filtered off and washed and dried. A 71.5% yield of copolymer having an intrinsic viscosity of 3.91 was obtained.

A 10% solution of this copolymer in dimethyl formamide had a viscosity of 1400 poises at 23° C. It was spun at room temperature of 75° F. (24° C.) through a spinneret having 42 holes each 8 mils in diameter through a water bath 3½ inches deep over the surface of the spinneret, covered with a ¼ inch layer of toluene. Under a pressure of 10 p. s. i. the solution was extruded at the rate of 2.39 grams per minute. The filaments were drawn through two driers, the first at 82° and the second at 124° C. by a draw wheel rotating at a peripheral speed of 8.9 feet per minute. The dried yarn stretched 900% at 173° C. As thus spun and stretched, the yarn had an U. T. S. of 4.0 g./d., an U. E. of 7.5% and a denier of 82.

The stretched yarn was relaxed by heating it under no tension for 30 seconds at 206° C. It shrank 22.4%. The shrunk yarn had an U. T. S. of 3.9 g./d., U. E. of 16.5% and 195 denier. By this shrinking treatment the ultimate elongation of the yarn had been more than doubled without a substantial loss in tensile strength.

The shrunk yarn when heated to 100° C. retained 71% of its original (room temperature) strength and heated to 140° C. retained 38% of its original strength.

For comparison with the foregoing copolymer, acrylonitrile was polymerized under identical conditions with respect to ratios of monomer, water and ammonium persulfate catalyst. The temperature range in this case was 63.5° to 75° C. After a 14 minute induction period and an 80 minute reaction period, a polymer having an intrinsic viscosity of 15.54, was obtained. The intrinsic viscosity was too high for this polymer to be successfully spun into fibers from solution in dimethyl formamide by the procedure employed for spinning a solution of the foregoing copolymer. Repeating this run except for heating the reaction mixture 3 hours at 62°–66° C. gave a 68% yield of polyacrylonitrile, but the product was only partially soluble in dimethyl formamide at 110° C. and a rubbery gel not suitable for spinning was obtained from 7 parts of the polyacrylonitrile and 93 parts dimethyl formamide.

*Example 5.*—This example illustrates the copolymerization of methacrylonitrile and acrylonitrile by the solution polymerization procedure. A dispersion of 50 parts methacrylonitrile and 200 parts acrylonitrile in 4150 parts water was prepared under an atmosphere of nitrogen gas. To this dispersion heated to 57.5° C., 1.35 parts of potassium persulfate and 0.240 part of sodium bisulfite were added (corresponding to 0.384 part $S_2O_8$ for every 100 parts monomer), together with an additional 100 parts water. The reaction mixture was maintained in the temperature range of about 57° to 60° C. for 5 hours. The resulting latex of copolymer was frozen and thawed to obtain a filterable slurrry. An 83.1% yield of copolymer was obtained.

Fibers wet spun by the procedure described above and illustrated in the accompanying drawing through a spinneret having 48 holes each 5 mils in diameter with the yarn stretched 780% at 145° C. had an U. T. S. in the range 3.2 to 3.7 g./d. and U. E. of 6.5% to 7%.

*Example 6.*—As an example of copolymers prepared by the emulsion polymerization procedure, 20 parts methacrylonitrile and 80 parts acrylonitrile were dispersed in 398 parts of water containing 2 parts of "Igepon T" (a commercial emulsifying agent having the reported composition $C_{17}H_{33}CONHC_2H_4SO_3Na$). The emulsion was heated to 68° C. under an atmosphere of nitrogen gas and 0.4 part ammonium persulfate dissolved in 50 parts water were added (corresponding to 0.337 part $S_2O_8$ for every 100 parts monomers) and after 3 hours and 30 minutes with the reaction mixture maintained at about 69° C. the polymer was coagulated by freezing and filtered from the liquid phase of the reaction product. The polymer was washed with water and methanol and dried. An 87.3% yield of copolymer having an intrinsic viscosity of 5.6 was obtained.

The copolymer thus prepared was dissolved in dimethyl formamide to give a 12% solution of the polymer which was spun through a spinneret with 48 holes each 5 mils in diameter, submerged 1½ inches below the surface of a water bath covered with a ⅛ inch layer of benzene. The filaments were dried at 125° C. and, after being gathered into a yarn, the latter was stretched 420% at 160° C. The resulting yarn had an U. T. S. of 3.3 g./d., an U. E. of 10% and a denier of 134.

Yarn thus prepared was annealed by heating for 10 minutes in air at 150° C. while being held under tension sufficient to prevent shrinkage of the yarn. The thus annealed yarn had an U. T. S. of 4.6 g./d. and an U. E. of 9%. This annealed yarn was then placed in a paraffin oil bath without being held under tension and allowed to shrink as the paraffin oil bath was heated from room temperature up to 150° C. The yarn shrank 10%. The thus shrunk yarn had an U. T. S. of 3.7 g./d., an U. E. of 18%, and a denier of 149.

Another yarn spun from the copolymer of this example under the conditions described above except for the yarn being stretched 400% at 170° C. was relaxed 13.2% by heating in air under no tension. The thus treated yarn had an U. T. S. of 4.0 g./d., and U. E. of 17% and a denier of 170. Held in water at 100° C. for 15 minutes, this yarn shrank an additional 1.4% and then had an U. T. S. of 4.1 g./d. and an U. E. of 17%. Another sample of this yarn which had been stretched 400% at 170° C. had an U. T. S. of 4.1 g./d., an U. E. of 8% and a denier of 140. It was annealed by heating in air for 15 minutes under tension not permitting shrinkage of the yarn. The annealed yarn had an U. T. S. of 4.6 g./d. and an U. E. of 9%. It was then heated in oil at 150° C. to shrink it 9.1% which produced a yarn having an U. T. S. of 3.9 g./d., an U. E. of 16% and a denier of 148.

*Example 7.*—A mixture of 30 parts methacrylonitrile and 70 parts acrylonitrile was copolymerized by the emulsion procedure described in Example 6 employing the same conditions for copolymerizing this mixture as in that example. An 86% yield of the copolymer was obtained which had an intrinsic viscosity of 4.3. Yarns spun from a 14% solution of the copolymer in dimethyl formamide at room temperature from a 48 hole spinneret, each hole 5 mils in diameter, through a 1½ inch water bath covered with ⅛ inch layer of benzene, were stretched 400% while heated at 180° C. The stretched yarns had an U. T. S. of 3.7 g./d., an U. E. of 7% and a denier of 143. Annealed by heating in air at 150° C. for 15 minutes under tension to prevent shrinkage, the yarn had an U. T. S. of 4.2 g./d. and an U. E. of 10%. The annealed yarn was then heated in oil at 150° C. to shrink the yarn 12.2%. The shrunk yarn had an U. T. S. of 3.5 g./d., an U. E. of 19% and a denier of 162.

*Example 8.*—The emulsion polymerization procedure of Example 6 was employed to copolymerize a mixture of 25 parts methacrylonitrile and 75 parts acrylonitrile. A yield of 81.2% of copolymer was obtained. This copolymer dissolved in dimethyl formamide to form a 12% solution was spun through a spinneret having 48 holes, each 5 mils in diameter. The resulting yarn was stretched 600% while heated at 170° C. to give a yarn having an U. T. S. of 4.1 g./d., an U. E. of 8% and a denier of 123. When this yarn was relaxed 13.1% heated in air at 150° C. and then annealed by heating in air for 15 minutes at 150° C. under tension preventing further shrinkage, the resulting yarn had an U. T. S. of 4.1 g./d., an U. E. of 16% and a denier of 136.

We claim:
1. Polymeric filaments or fibers in which the polymeric material is a copolymer of acrylonitrile with, as the principal other copolymer constituent, methacrylonitrile in the ratio by weight of more than 15 parts methacrylonitrile to 85 parts acrylonitrile but not substantially more than 30 parts methacrylonitrile to 70 parts acrylonitrile.

2. Polymeric filaments or fibers in which the polymeric material is a copolymer of acrylonitrile with, as the principal other copolymer constituent, methacrylonitrile in the ratio by weight of about 20 parts methacrylonitrile to 80 parts acrylonitrile.

References Cited in the file of this patent

UNITED STATES PATENTS

| Number | Name | Date |
|---|---|---|
| 2,161,766 | Rugeley | June 6, 1939 |
| 2,321,635 | Taylor | June 15, 1943 |
| 2,436,926 | Jacobson | Mar. 2, 1948 |
| 2,456,360 | Arnold | Dec. 14, 1948 |
| 2,486,241 | Arnold | Oct. 25, 1949 |
| 2,587,465 | Ham et al. | Feb. 26, 1952 |